(12) United States Patent
Garcia

(10) Patent No.: US 7,063,635 B2
(45) Date of Patent: Jun. 20, 2006

(54) COMPLIANT CHAIN GUIDE WITH BLADE SPRING

(75) Inventor: Mariano Garcia, Ithaca, NY (US)

(73) Assignee: BorgWarner Inc., Auburn Hills, MI (US)

( * ) Notice: Subject to any disclaimer, the term of this patent is extended or adjusted under 35 U.S.C. 154(b) by 141 days.

(21) Appl. No.: 10/692,182

(22) Filed: Oct. 23, 2003

(65) Prior Publication Data
US 2005/0090345 A1    Apr. 28, 2005

(51) Int. Cl.
*F16H 7/08* (2006.01)

(52) U.S. Cl. .................................................. 474/111
(58) Field of Classification Search ............... 474/101, 474/109, 111, 140
See application file for complete search history.

(56) References Cited

U.S. PATENT DOCUMENTS

| 5,445,568 A | 8/1995 | Fukuzawa et al. ........... 474/144 |
| 5,462,493 A * | 10/1995 | Simpson ...................... 474/111 |
| 5,551,926 A | 9/1996 | Ebert et al. .................. 474/101 |
| 5,711,732 A * | 1/1998 | Ferenc et al. ................ 474/111 |
| 5,797,818 A * | 8/1998 | Young .......................... 474/111 |
| 6,155,941 A | 12/2000 | White et al. ................. 474/110 |
| 6,238,311 B1 * | 5/2001 | Cutting ........................ 474/111 |
| 6,312,353 B1 | 11/2001 | Oba ............................ 474/140 |
| 6,440,020 B1 * | 8/2002 | Tada ........................... 474/111 |
| 6,447,414 B1 | 9/2002 | White et al. ................. 474/110 |
| 2002/0061799 A1 | 5/2002 | Young .......................... 474/111 |

FOREIGN PATENT DOCUMENTS

| JP | 61147928 | 1/1988 |
| JP | 09081071 | 3/1998 |
| JP | 08343135 | 7/1998 |
| JP | 2000315775 | 10/2000 |

* cited by examiner

*Primary Examiner*—Vicky A. Johnson
(74) *Attorney, Agent, or Firm*—Brown & Michaels, PC; Greg Dziegielewski

(57) ABSTRACT

A chain guide has an elastic member and a wear face. The wear face has the elastic member captured therein. The wear face has an inside surface and an outside surface. The first surface is disposed to contact a chain. The other surface is in contact with the elastic member. Through the compliance of the wear face and the elastic member, the chain guide absorbs some degree of impacts and transverse vibrations, both of which can affect chain control, guide wear, and bracket fatigue.

4 Claims, 2 Drawing Sheets

COMPLIANT CHAIN GUIDE WITH BLADE SPRING

FIELD OF THE INVENTION

The invention pertains to the field of chain guides in chain drives. More particularly, the invention pertains to a compliant chain guide with a blade spring. The preferred embodiment of the present invention is for use in engine timing systems.

BACKGROUND OF THE INVENTION

The use of chain guides is known in the art. A chain guide is also known as a stationary arm, which is stationary in relation to a moving endless chain, thereby guiding the chain along a desired path and preventing unwanted side-to-side motions. Typically, a chain guide works in conjunction with a chain tensioner that takes up excess slack to keep the endless chain in a desired tensioned state.

U.S. Pat. No. 6,447,414, which is hereby incorporated herein by reference teaches a chain tensioner system having a hydraulic tensioner and a tensioner arm with a spring blade. A hydraulic tensioner applies force against the end of the tensioner arm. The arm is pivotally supported at one end and supported by the tensioner piston at the other end. A blade spring is inserted into the plastic shoe to provide tension to the arm.

Typically a chain guide is positioned opposite the tensioner system in that one strand, or portion, of the endless chain is in contact with the chain guide and another strand of the same endless chain is in contact with a shoe or face of the chain tensioner. Over the operating life time of a chain system such as an engine timing chain system, the characteristic of the chain system tends to alter. In other words, for a chain system, it is important to impart and maintain a certain degree of tension to the chain to prevent noises or slippage. Prevention of slippage is especially important in the case of a chain driven camshaft in an internal combustion engine because slippage may alter the camshaft timing by several degrees, possibly causing poor performance or even damage to an engine system. In the harsh environment in which an internal combustion engine operates, chain tension can vary between excessively high or low levels as a result of the wide variations in temperature and differences between the coefficients of linear expansion among the various parts of the engine, including the chain and the tensioner system that keeps the chain in a suitable tension. Furthermore, camshaft and crankshaft induced torsional vibrations cause chain tension to vary considerably. This tension variation results in chain elongation. Moreover, wear of the chain components during prolonged use can cause permanent elongation of the chain that results in a decrease in the tension of the chain. To keep the chain in the suitable tensioning state, a tensioner arm is required in many cases.

Therefore, it is known to use an elastic element such as the blade spring of U.S. Pat. No. 6,447,414 to, in part, maintain the requisite tension of the chain. However, chain guides are usually designed to be rigid or stationary. Blade springs are not known to be used or incorporated in a chain guide system. Compliance in the guide can improve drive behavior by reducing impact forces on the wear surface, and also can reduce forces on the supporting brackets and/or guide mounts. Therefore, it might be desirous to have a suitable device incorporating an elastic member such as a blade spring in a chain guide to provide some elasticity or compliance. The distinction between the compliant guide and the rigid or flexible tensioner arm is that the guide is only designed to provide a small amount of compliance in order to reduce forces, whereas the tensioner arm is designed for a much larger range of motion in order to accomodate chain wear and stretch.

SUMMARY OF THE INVENTION

The present invention teaches a device which incorporates an elastic member that is inserted in a chain guide to provide some compliance.

A slightly non-rigid or non-stationary compliant chain guide is provided for improved drive behavior.

A compliant chain guide disposed to being used in short-center distance drives is provided. This chain guide possesses low cost in design and can improve chain performance, especially on certain short-center distance drives.

In the present invention, a slight amount of travel is provided for the compliance of the guide and for force-reduction, but not for the purpose of maintaining tension upon the chain. One distinguishing feature between the present guide and that of a tensioner arm is that the total travel length of a tensioner arm can be significantly greater than that of the guide in the present invention. In other words, the present invention is not intended to function as a tensioner in that it cannot take up large amounts of slack. Rather, the compliance is meant to dampen out impacts and transverse vibrations that can affect chain control, guide wear, and bracket fatigue. One of the beneficial results the compliant chain guide is a low cost design which can improve chain performance, especially on certain short-center distance drives.

A chain guide that has an elastic member, a wear face, and possibly some kind of mounting bracket or support fixture is provided. The elastic member is captured therein. The wear face has an inside and outside surface. The outside surface is disposed to contact a chain. The inside surface is in contact with the elastic member. Through the motion of the elastic member, the chain guide absorbs and dampens out impacts and transverse vibrations, both of which can affect chain control, guide wear, and bracket fatigue.

DESCRIPTION OF THE PREFERRED EMBODIMENT

This section includes the descriptions of the present invention including the preferred embodiment of the present invention for the understanding of the same. It is noted that the embodiments are merely describing the invention. The claims section of the present invention defines the boundaries of the property right conferred by law.

Figure 1:
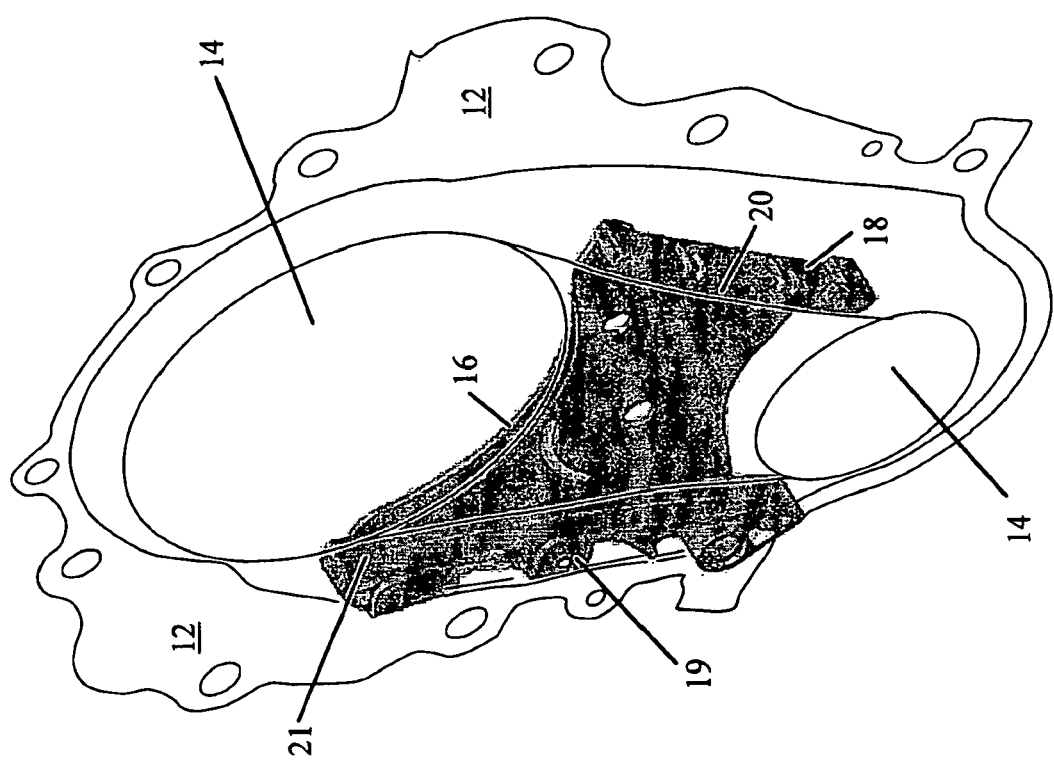
FIG. 1 shows a chain guide and it's environ.
Figure 2:
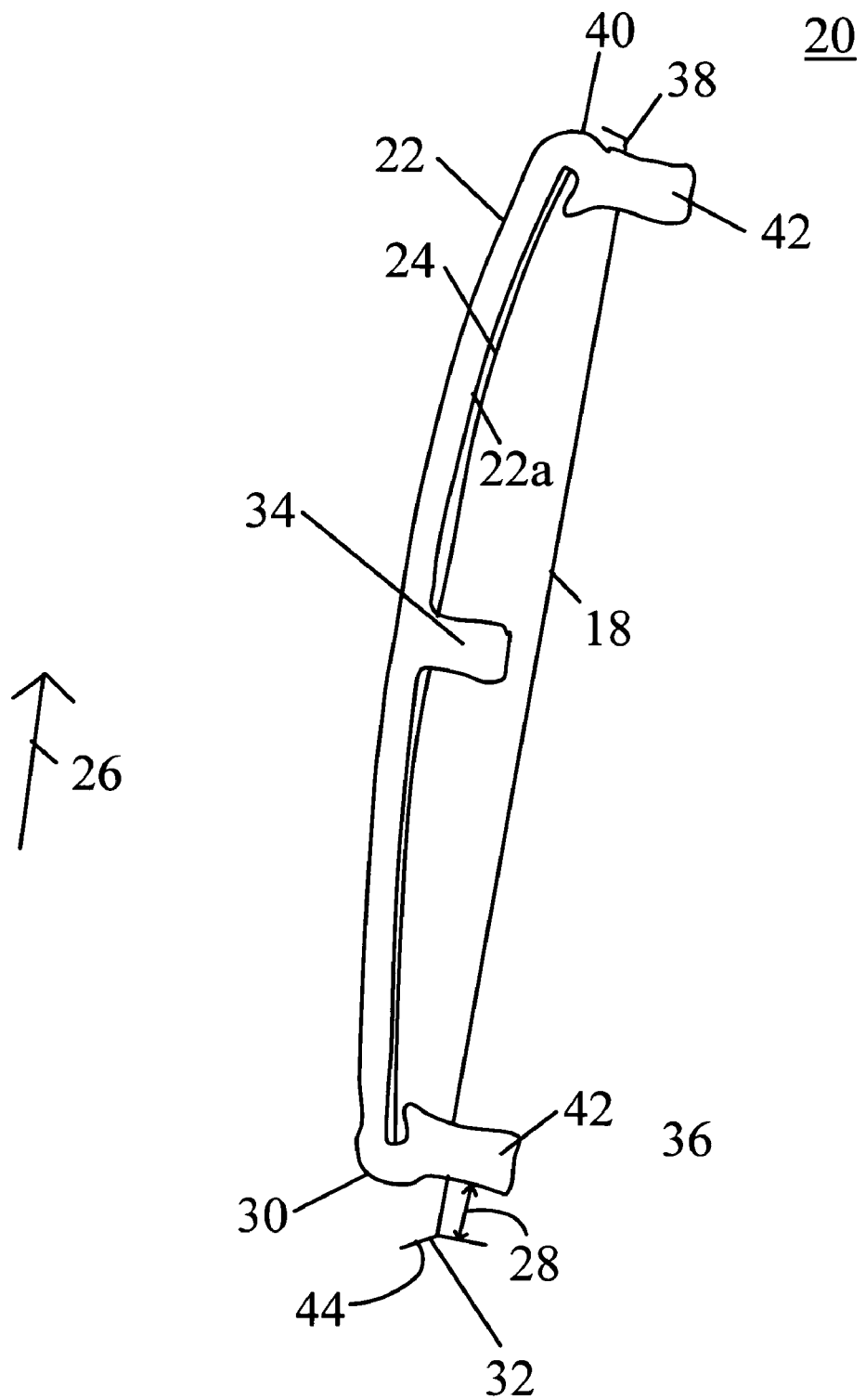
FIG. 2 shows a chain guide of the present invention.

Referring to FIGS. 1 and 2, a preferred embodiment of the present invention is shown. An engine front cover 12 is provided and an inside view is shown. Front cover 12 has a pair of locations 14 for accommodating both a driving gear and a driven gear (both not shown). An endless chain (also not shown) is disposed to connect and engage both the driving gear and the driven gear. Bracket 16 is suitably affixed upon front cover 12. Bracket 16 has a first flange 18 and a second flange 19. First flange 18 is disposed to have a chain guide device 20 mounted thereon; and second flange 19 is disposed to have a tensioner system 21 mounted thereon.

Referring specifically to FIG. 2, a detailed depiction of the chain guide device 20 is shown. Wear face 22 is clipped to bracket 16 which may be part of a supporting metal bracket. First flange 18 may be a material extension of bracket 16 of FIG. 1. Wear face 22 can be any suitable low-friction material such as nylon, ZYTEL (which is currently a trademark of DuPont company), etc. The device such as 20 has a blade spring 24 either inserted in the guide 20, or in contact with a surface 22a opposite of one that is in contact with the chain such as wear face 22. Wear face 22 (that may be a plastic guide surface) may be molded with a slight amount of curvature so that it can possess a small amount of travel, which can cause wear face 22 to slide however slightly along first flange 18 of bracket 16. The slight amount of travel may be along a direction of chain movement 26. A gap 28 is provided between a first end 30 of wear face 22 and a first end portion 32 of first flange 18. The first end portion 32 may comprise a lip 44 for stopping any further sliding movement of the retaining clip 42 of the wear face 22 along a direction on the first flange 18.

The reason that the present invention only allows for slight movement of oscillation of the chain guide is rooted in the function of a chain guide. Unlike a tensioner arm that is designed to take up slack, the chain guide is used to guide a chain along its direction of travel 26. The present invention introduces means to add compliance so that the chain and wear face can move however slightly in relation to the guide's nominal design position.

The prior art chain guide that rigidly affixes a face onto a flange can experience wear on the face. The present invention teaches a compliant chain guide 20 that compresses however slightly with forces exerted by the chain upon the guide 20, thereby reducing the force exerted upon the face 22 by the chain. A compression stop 34 may be necessary to limit the slight oscillation or movement of the compliant chain guide 20. The limitation may comprise the stopping of any further movement along a direction caused by the chain which exert a force upon the chain guide. Without any force exerted upon the face 22 by the chain, a second gap 36 exists between compression stop 34 and first flange 18. When a force is exerted upon the face 22 by the chain, the width of gap 36 is reduced. The dimension of gap 36 is a design choice. In other words, the limit to this aspect of compliance may be predetermined.

First flange 18 may have a second end portion 38 having similar structure as that of the first end portion 32 in that the second end portion 38 is disposed to receive a second end 40 of the wear face and render the same to slide, however slightly, along a direction on first flange 18. Second end 40 may include a clip 42 for clipping onto flange 18. Similarly, second end portion 38 may comprise a lip 44 for stopping any further sliding movement of the retaining clip 42 of the wear face 22 along a direction on the first flange 18. In the neighborhood of the second end portion 38, a similar structure may exist as that of the first end portion 30 in that second end portion 30 may comprise a lip for stopping any further sliding movement of the retaining clip of the second end 40 of the wear face 22 along a direction on the first flange 18. A gap between the lip 44 on the first flange 18 and the second end portion 30 may exist.

As can be appreciated, the chain in addition to moving along its direction of travel, may oscillate however slightly perpendicular to its direction of travel. The present invention's compliant chain guide 20, having an elastic member such as blade spring 24, provides an allowance or compliance for the chain's slight oscillation. The blade spring 24 is disposed to support the plastic face 22. The plastic face 22 is captured by the flange 18 but allowed to slide. One means to achieve this is to have the face 22 held onto the flange 18 by clips 42 which extend off the side. If necessary, the bracket might have lips 44 to take up any side-loading caused by friction from the chain and/or stops to prevent the guide from over-compressing.

It is noted that prior art chain guides are usually designed to be rigid or stationary. But compliance in the guide can improve drive behavior. The present invention teaches a device such as 20 which incorporates an elastic member such as a blade spring 24 that is inserted in the guide 20 to provide some compliance. By way of an example, a plastic guide surface or face may be molded with a slight amount of curvature so that it has a small amount of travel. The slight amount of travel is provided for the compliance of the guide and not for the purpose of maintaining tension upon the chain. One distinguishing feature between the present guide and that of a tensioner arm is that the life time travel length of a tensioner arm can be significantly greater than that of the guide in the present invention. In other words, the present invention is not intended to function as a tensioner in that it cannot take up large amounts of slack. Rather, the compliance is meant to dampen out impacts and transverse vibrations that can affect chain control, guide wear, and bracket fatigue. The result of the compliant chain guide is a low cost design which can improve chain performance, especially on certain short-center distance drives.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A chain guide, comprising:
    a body having a wear face comprising a first surface for contacting a chain and a second surface opposite the first surface;
    an elastic member disposed against the second surface of the wear face, biasing the wear face toward the chain;
    a retaining clip at each end of the wear face;
    a seating member extending along the length of the wear face penetrating the retaining clips and supporting the body, wherein the seating member further comprises a lip preventing further sliding movement of the retaining clips relative to the seating member, such that as the chain exerts force on the chain guide, the retaining clips slide on the seating member, dampening and absorbing impacts and transverse vibrations that can affect chain control, guide wear, and bracket fatigue.

2. The chain guide of claim 1, wherein the wear face further comprises a compression stop extending from the second surface toward the seating member.

3. The chain guide of claim 1, wherein the seating member comprises a support bracket or a flange extending therefrom.

4. The chain guide of claim 1, wherein the wear face is made of a plastic material.

* * * * *